US00RE39660E

(19) United States
(12) Reissued Patent
Szwarc et al.

(10) Patent Number: US RE39,660 E
(45) Date of Reissued Patent: May 29, 2007

(54) SURFACE MOUNTED FOUR TERMINAL RESISTOR

(75) Inventors: Joseph Szwarc, Ramat-Gan (IL); Joel J. Smejkal, Columbus, NE (US)

(73) Assignee: Vishay Dale Electronics, Inc., Columbus, NE (US)

(21) Appl. No.: 09/568,937

(22) Filed: May 11, 2000

Related U.S. Patent Documents

Reissue of:
(64) Patent No.: 5,999,085
Issued: Dec. 7, 1999
Appl. No.: 09/247,490
Filed: Feb. 10, 1999

U.S. Applications:
(60) Provisional application No. 60/074,570, filed on Feb. 13, 1998.

(51) Int. Cl.
*H01C 1/012* (2006.01)

(52) U.S. Cl. ..... 338/309; 338/20; 338/320; 338/328; 338/330; 219/216; 219/539

(58) Field of Classification Search ..... 338/20, 338/99, 112, 83–84, 308–309, 312, 320, 322–326, 338/328–330, 332; 219/216, 539, 543
See application file for complete search history.

(56) References Cited

U.S. PATENT DOCUMENTS

| | | | | | |
|---|---|---|---|---|---|
| 4,429,298 | A | | 1/1984 | Oberholzer | 338/195 |
| 4,837,549 | A | * | 6/1989 | Kirilloff et al. | 338/279 |
| 4,894,258 | A | * | 1/1990 | Belanger, Jr. | 427/103 |
| 5,258,738 | A | | 11/1993 | Schat | 338/332 |
| 5,287,083 | A | | 2/1994 | Person et al. | 338/332 |
| 5,548,269 | A | * | 8/1996 | Katsuno et al. | 338/325 |
| 5,667,712 | A | | 9/1997 | Sutorius et al. | 219/535 |
| 5,815,065 | A | * | 9/1998 | Hanamura | 338/309 |
| 6,401,329 | B1 | * | 6/2002 | Smejkal et al. | 29/619 |

* cited by examiner

*Primary Examiner*—K. Lee
(74) *Attorney, Agent, or Firm*—McKee, Voorhees & Sease, P.L.C.

(57) ABSTRACT

An electrical resistor has a surface mounted four terminal current sensor of a very low resistance value and capable of handling short pulses of high power. It comprises a flat metal late, 1 to 50 mils thick, of an alloy of high electrical resistivity, to which are welded, on two opposite sides, two flat metal plates of very high electrical conductivity which serve as terminations for electrical interconnection. A slot is cut, from the outside edge toward the center, into each of the two termination plates which divides them into a wide pad for connection of current carrying wires and a narrow one for voltage sensing. The depth of the slots is optimized to get the best stability of resistance readings with changing ambient temperature and under influence of the self-heating effect.

4 Claims, 2 Drawing Sheets

SURFACE MOUNTED FOUR TERMINAL RESISTOR

Matter enclosed in heavy brackets [ ] appears in the original patent but forms no part of this reissue specification; matter printed in italics indicates the additions made by reissue.

This application is based upon the applicants' provisional application Ser. No. 60/074,570 filed Feb. 13, 1998.

BACKGROUND OF THE INVENTION

The present invention relates to a surface mounting four terminal current sensing resistor of very low ohmic value and high stability.

Surface mounted current sensing resistors have been available for the electronic market for many years. Their construction comprises a flat plate made of a resistive alloy like the Cu—Mn—Ni alloy onto which are plated lands of high conductivity metal forming the four terminals. The voltage-sensing node is set in the resistive alloy.

When applied to ohmic values in the range of a few millohms or less, this construction introduces additional Joule losses due to the resistance between the point of connection of the current carrying wires and the a/m nodes. This leads to an additional temperature rise and results in drifts of the measurements.

The primary object of this invention is to provide an improved very low value surface mounted current sensor characterized by high stability when subjected to high ambient temperatures and to pulses of high power.

A further object of this invention is the provision of a resistor made of an alloy of high resistivity in order to increase its thermal capacity.

A still further object of this invention is the provision of a resistor in which the dimensions of the resistive plate are chosen in a way to minimize the length of the trimming cuts thus avoiding hot spots at points where the current makes a turn of 180 degrees.

A still further object of this invention is the provision of a resistor with terminals made of thick, high thermal conductivity material, which acts also as a heat sink during a power pulse.

A still further object of this invention is the provision of a resistor, which is constructed in a way to be capable of withstanding pulses of high power by choice of materials withstanding high temperatures and by reducing thermal resistance within the resistor.

A further object of this invention is the provision of a resistor which can be mass produced by stamping, laser trimming and coating by methods described in U.S. Pat. No. 5,604,477 and which can receive a high power rating when cemented to a metal base for soldering to a heat sink.

A still further object of this invention is the provision of a resistor that has terminals plated, for interconnection either by soldering or by welding.

SUMMARY OF THE INVENTION

A surface mounted resistor is formed by welding to each side of a resistive strip of Ni—Cr alloy two strips, one narrow and another wide, of a Ni plated high conductivity copper. The thickness and width of the resistive strip are chosen to form a resistance value below but close to the requested target, and therefore to minimize the extent of posterior laser trimming. This composite strip is punched to form individual resistors in a way described in the U.S. Pat. No. 5,604,477, but with an additional slot in the terminations in order to divide them into distinct current and sense pads, the current pad being at least twice as long as the sense pad. The depth of the slots is optimized to get the best stability of resistance readings with changing ambient temperature and under influence of the self-heating effect. The punched resistors remain attached to the wide copper strip by one current pad. This configuration permits four terminal (Kelvin) measurements of resistors on a continuous strip during subsequent trimming operation.

Solder coating is applied to the pads in case the application calls for interconnection by soldering.

When the intended interconnection is by ultrasonic bonding of aluminum wires, the Nickel coating applied before welding the strips serves this purpose. Next, the resistors are cut off the strip.

DESCRIPTION OF THE PREFERRED EMBODIMENT

Figure 1:
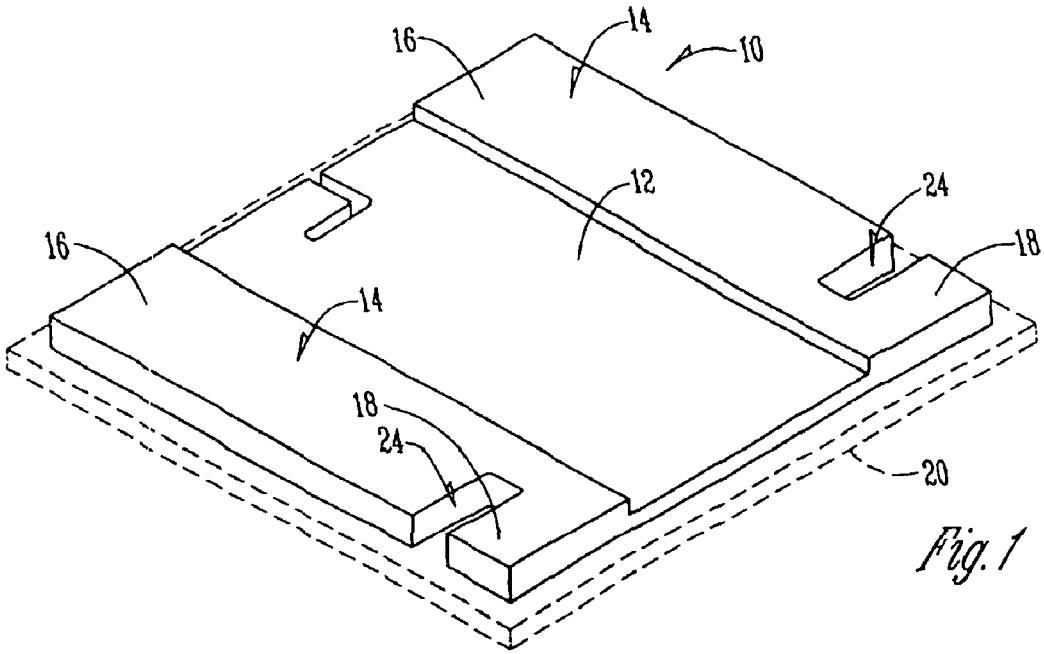
FIG. 1 is a perspective view of the device of this invention.
Figure 2:
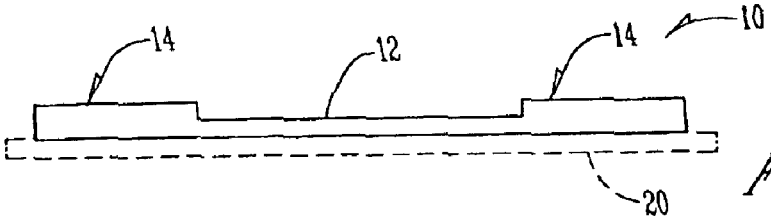
FIG. 2 is an end elevational view.
Figure 3:
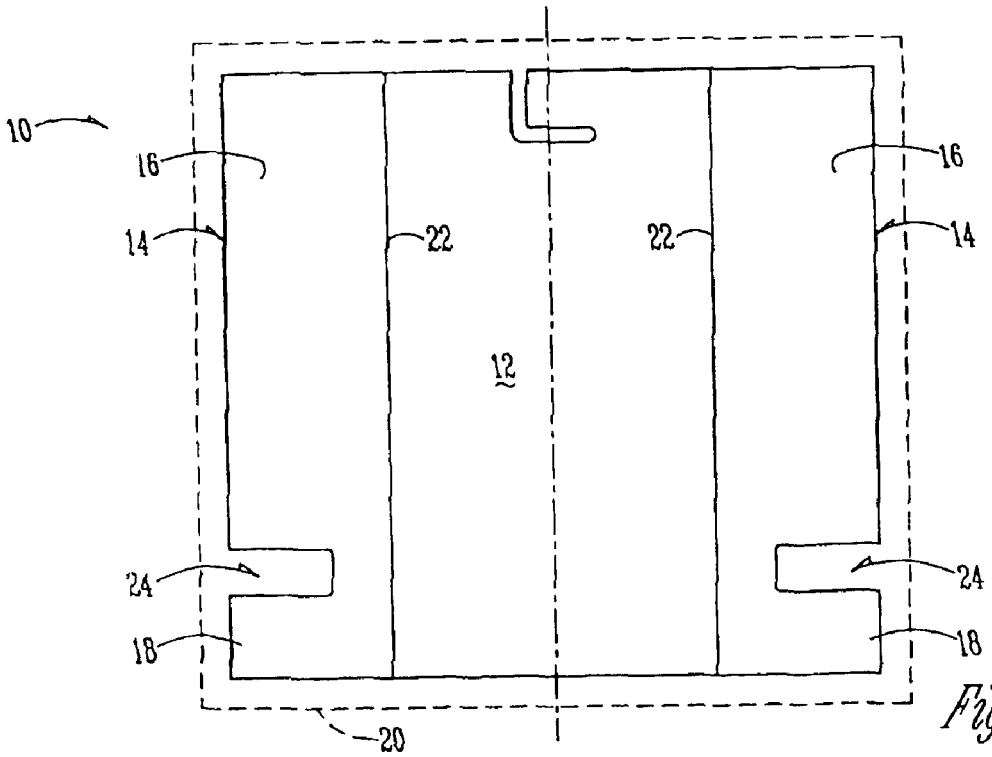
FIG. 3 is a top plan view.
Figure 4:
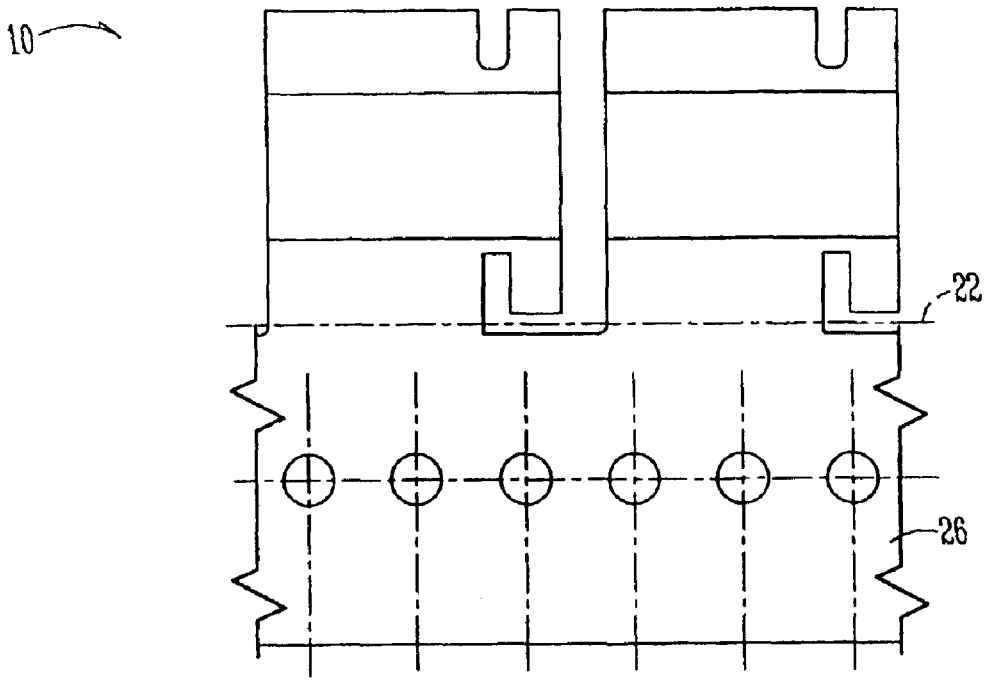
FIG. 4 is a top plan view of a punched wide copper strip.
Figure 5:
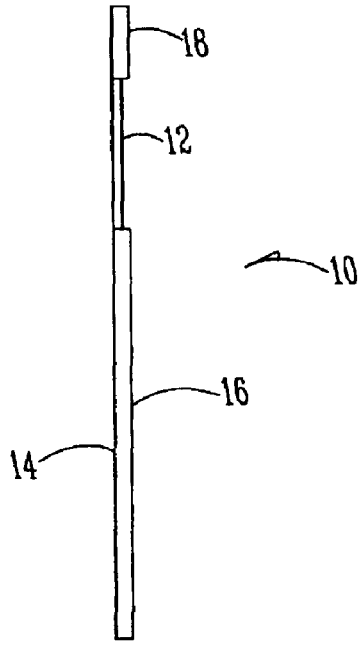
FIG. 5 is a side elevational view of FIG. 4.

The numeral 10 designates the resistor of this invention. It includes a resistor plate 12 with a pair of pads 14 secured thereto. Each pad has a current pad portion 16 and a sense pad portion 18. Resistor 10 is adapted for mounting on substrate 20. Specifically, the surface mounted resistor 10 is formed by welding to each side of the resistive strip 12 of Ni—Cr alloy two strips 14, one narrow and another wide, of a Ni plated high conductivity copper. The thickness and width of the resistive strips 12 are chosen to form a resistance value below but close to the requested target, and therefore to minimize the extent of posterior laser trimming. This composite strip is punched on lines 22 (FIG. 4) to form individual resistors 10 in a way described in the U.S. Pat. No. 5,604,477 (incorporated herein by reference), but with an additional slot 24 in the terminations in order to divide them into distinct current and sense pads, the current pad 16 being at least twice as long as the sense pad 18. The depth of the slots is optimized to get the best stability of resistance readings with changing ambient temperature and under influence of the self-heating effect. One current pad 16 of the punched resistors remains attached to the wide copper strip 26. This strip 26 configuration permits four terminal (Kelvin) measurements of resistors on a continuous strip during subsequent trimming operation.

As previously indicated, solder coating is applied to the pads in case the application calls for interconnection by soldering.

When the intended interconnection is by ultrasonic bonding of aluminum wires, the Nickel coating applied before welding the strips serves this purpose. Next, the resistors 10 are cut off of the strip 26 on lines 14.

In case the application calls for mechanical assembly by soldering the device to a metal substrate 20, the resistors 10 are bonded with electrically insulating cement of high thermal conductivity to a metal base. The bottom of the base may be plated with nickel and gold for better solderability to the substrate.

The layers of resistor 10 are secured together with a high thermal conductivity dielectric cement, such as ceramic powder filled high temperature cements. Use of beryllium oxide in such cements is a component that functions well.

I claim:

1. A surface mounted *four* terminal *connection current sensing* resistor *for Kelvin type measurement* comprising[.]*;* a flat *metal* plate made of a resistive alloy having opposite side surface portions, a pair of [high conductivity] *conductive* metal terminal plates each [secured] *welded* to a separate side [of the resistance plate with a high thermal conductive dielectric cement] *and supported by the resistive plate*, a slot [inserted] *cut* transversely in the terminal plates creating four separate pad portions, said slot set to a *partial* depth that determines the [best] stability of [resistance for] *sensed voltage drop over* the resistor, said [pad portions] *terminal plate* being split into a current pad and a sense pad with each pad portion comprising terminal connection areas;

said current pad portion having a length greater in a direction from said slot than the corresponding length of said sense pad portion, said *sense* pad portions [being] *enabling a measurement of voltage drop proportional to the value of current flowing between the said current pads and* resistive to drifts in electrical measurements created by temperature rises that occur due to pluses of high power or [high] *to changing* ambient temperatures.

*2. A surface mount four terminal resistor having a stability of resistance, comprising:*

*a flat metal resistive plate made of a resistive alloy material having opposite first and second sides;*

*a first plate of conductive metal attached to and supported by the first side of the flat metal resistive plate;*

*a second plate of conductive metal attached to the second side of the flat metal resistive plate;*

*a first slot cut transversely in the first plate;*

*a second slot cut transversely in the second plate;*

*the stability of measured resistance at least partially determined by the depth of each slot;*

*the first slot dividing the first plate of conductive metal into a first sense pad and a first current pad;*

*the second slot dividing the second plate of conductive metal into a second sense pad and a second current pad;*

*each of the pads providing a terminal connection area;*

*each of the current pads having a length greater in a direction from said slot than the corresponding length of the corresponding sense pad.*

*3. The surface mount four terminal resistor of claim 2 wherein the length of each of the current pads is at least twice as long as the corresponding length of the corresponding sense pad.*

*4. The surface mount four terminal resistor of claim 2 wherein the resistor is bonded to a metal substrate with a dielectric cement for better heat dissipation.*

* * * * *